CONTINUOUS TONE-CONTROLLED SQUELCH SYSTEM

Filed Jan. 2, 1958

INVENTORS:
RICHARD T. BUESING,
RICHARD P. GIFFORD,
NEAL H. SHEPHERD,

BY Joseph P. Kates
THEIR ATTORNEY.

United States Patent Office 3,049,710

Patented Aug. 14, 1962

3,049,710

CONTINUOUS TONE-CONTROLLED SQUELCH SYSTEM

Richard T. Buesing, Syracuse, Richard P. Gifford, De Witt, and Neal H. Shepherd, Syracuse, N.Y., assignors to General Electric Company, a corporation of New York Filed Jan. 2, 1958, Ser. No. 706,813
4 Claims. (Cl. 343—226)

Figure 1:
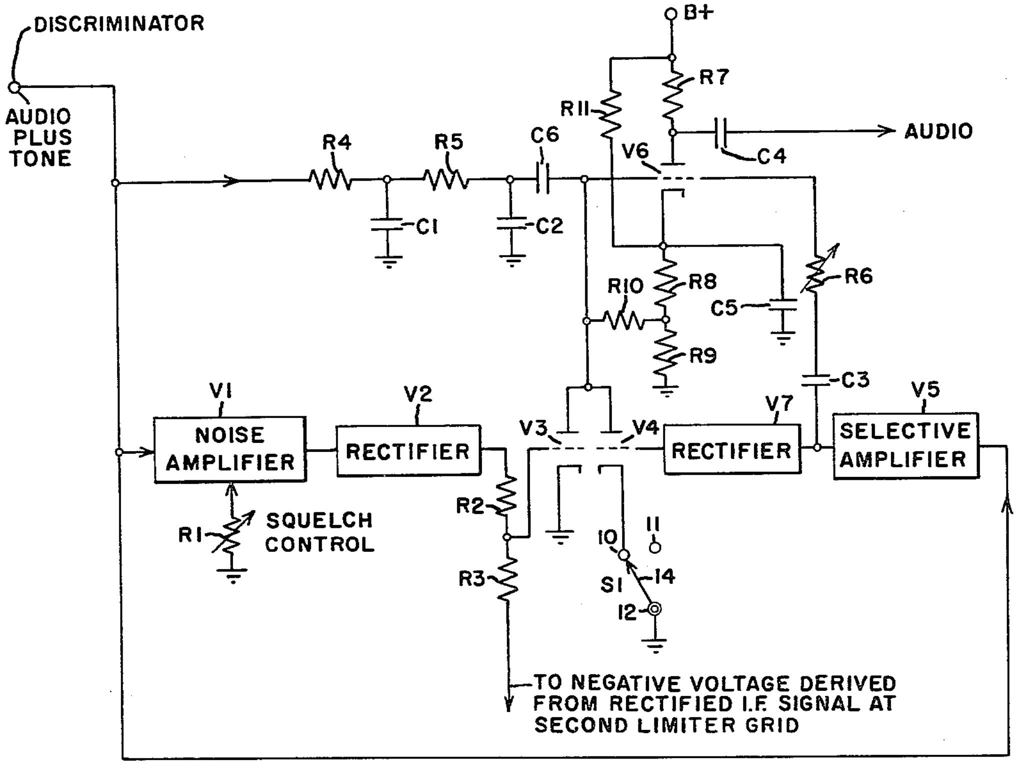

The present invention relates to a continuous tone-controlled squelch system and more particularly relates to an apparatus and method incorporating "double-barreled squelch" plus automatic monitoring wherein a receiver remains squelched by the use of both conventional noise squelch and tone squelch.

In the system of the present invention, in order for audio to be heard at a receiver output, a carrier of the correct RF frequency modulated by a tone of the correct audio frequency must appear at the receiver antenna terminals. Thus, by means of the present invention when several users share the same radio frequency channel, the user equipped with double-barreled squelch can be deaf to all other calls except his own while receiving. However, in accordance with this invention, the user retains automatic means of disabling the tone squelch prior to making a call. In this manner monitoring of the air before transmitting may take place which guarantees that the operator will know that other conversations are in progress.

The inventive method and apparatus therefore describes a transmitting and receiving method and apparatus which provides a user with means to hear only his own systems calls and then to temporarily and automatically hear all calls prior to transmitting.

Prior arts systems exist which use noise squelch, for example, the squelch system described in U.S. Patent No. 2,343,115 of Daniel E. Noble issued February 29, 1944, for "Radio Receiver Circuit" and assigned to Motorola. U.S. Patent No. 2,743,361 of Edward Bauman for Selective Squelch Receiver issued April 24, 1956, also provides a squelch system. Such systems may provide a monitoring switch but it must be remembered and switched by the operator as a separate deliberate operation when it is desired to monitor a channel. If the channel is in use the message is heard, but if the channel is not in use the "squelch roar" of noise is heard at the receiver output. This noise output will appear at a volume level only about 3 decibels below the peak volume of normal voice. The noise is discomforting to the extent that the operator may not throw the switch to monitor because of the annoyance and also because of the lack of an automatic means, he may forget or get the habit of omitting this step, especially in times of urgency. The operators may thereby be discourteous to other users and furthermore illegal operation in derogation of the spirit and the letter of the requirements of the Federal Communications Commission may occur. Thus, the devices of the prior art do not possess advantages of automatic monitoring, do not solve the problems of personal inconvenience and discomfort of the user, lack some features of the "double-barreled" approach of the present invention and permit of unknowing disruption of communications in progress on user channels.

The present invention overcomes these and other disadvantages of the prior art systems and also provides advantages of incorporation of "double-barreled" squelch action combined with automatic monitoring before transmitting to prevent disruption of communication and to provide convenience and comfort for the operator, enabling of the receiver operator to hear any calls on the RF frequency to which the receiver is resonant, providing for apparatus to disable the tone squelch function when necessary, providing for an automatic monitoring facility so as not to disrupt other communications on the same channel, providing for a special switching means to give automatic channel monitoring, providing for absolute legality in use, providing for a method of monitoring that produces modulation output only when an RF carrier of the frequency to which the receiver is resonant is present at the receiver antenna terminals in contrast to prior art systems which merely offer a method of monitoring to produce either modulation or noise output whenever the squelch circuit is in the monitor condition and providing for inclusion of a special feed back loop to cancel out an audio tone of a predetermined frequency. Additionally, in contrast to prior art systems and methods, a relatively simple, economical, apparatus readily fabricated is provided.

Accordingly an object of the present invention is to provide a continuous tone-controlled squelch system incorporating "double-barreled" squelch action combined with automatic monitoring.

Another aim of the present invention is to provide a transmitter-receiver system wherein the receiver will remain squelched by the use of both conventional noise squelch and tone squelch and in a simple yet superior manner.

Another purpose of the present invention is to provide an improved receiver which will be squelched by noise and tone squelch in a relatively fault-free manner and wherein in order for audio to be heard at the receiver output, a carrier of the correct radio frequency modulated by a tone of the correct audio frequency must appear at the receiver antenna terminals.

Another object of the present invention is to provide a type of transmitter-receiver system useable by several users concurrently to share the same radio frequency channel and wherein a double-barreled squelch system is provided to enable the users to monitor the air and not interfere with other conversations in progress together with automatic means of disabling the tone sensitive portion of the system prior to making a call.

Another purpose of the present invention is to provide a method of enabling a user of a particular channel system to hear only his own systems calls and then to temporarily and automatically hear all calls in a normal manner prior to transmitting.

Another aim of the instant invention is to provide automatic means for the operator of a continuous tone-controlled squelch receiver and associated transmitter to monitor the radio frequency channel before transmitting in order to not unknowingly disrupt communications in progress on the channel.

Another object of the present invention is to provide automatic means for the operator of a continuous tone-controlled squelch receiver and associated transmitter to monitor the assigned RF channel before transmitting to prevent disruption of communications in progress on the channel and wherein the monitoring function performance will not inconvenience the operator in any way.

Another object of the present invention is to provide a double-barreled squelch method and apparatus which will have an automatic monitoring feature wherein noise which is discomforting to the operator will not exist and wherein absolute legality in accordance with FCC regulations may be conveniently and automatically ensured.

Another purpose of the present invention is to provide a receiver transmitter system wherein an operator will hear a message when the channel is in use but wherein tone and noise-operated squelch keeps the receiver audio circuit in a non-conducting state when the channel is not in use to thereby provide a method of monitoring to produce audio output only when a radio frequency carrier of the frequency to which the receiver is resonant is present at the receiver antenna terminals and when a message intended for the user is on the air.

Another aim of the present invention is to provide a transmitter-receiver system operable upon specific assigned channels to a number of users wherein an operator will be provided with automatic monitoring at no personal inconvenience or discomfort to enable such monitoring to be advantageously conducted in a manner to ensure compliance with Government agency regulations.

Another object of the present invention is to provide a receiver-transmitter channel system shared by a number of users wherein courtesy to each of the other users will be automatically provided in a way to present minimum inconvenience to any particular user.

Figure 2:
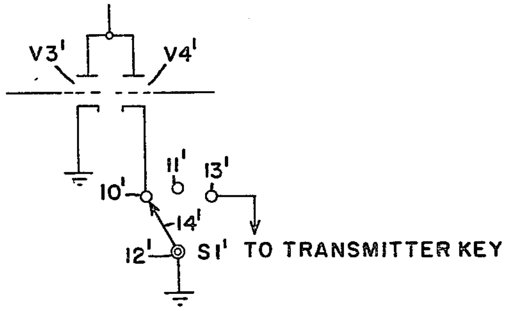

While the novel and distinctive features of the invention are particularly pointed out in the appended claims, a more expository treatment of the invention, in principle and in detail, together with additional objects and advantages thereof, is afforded by the following description and accompanying drawings in which:

FIG. 1 of the drawings presents a schematic representation of a first preferred embodiment of the illustrative apparatus and also provides illustration to facilitate understanding of the method of the present invention, and wherein this form of the invention employs a hangup switch for control switch purposes; and FIG. 2 schematically represents a portion of a second embodiment of the invention wherein a lever key device is employed for the control switch function.

Referring now more particularly to the figures of the drawing, the signal input from the discriminator at the point so labelled desirably may consist of audio signals plus a certain predetermined low frequency tone. For example, 100 c.p.s. could be the tone frequency predetermined for a particular user. When no signal is present at the receiver antenna terminals (not shown), the noise output at the discriminator is high. The high frequency components of the noise may be amplified by the noise amplifier V1 and may be rectified by noise rectifier V2. The noise amplifier V1 may amplify primarily those frequencies from 4,000 to 20,000 cycles per second (c.p.s.). In the circuit of the noise amplifier V1 may be inserted a squelch control resistor R1 which may be a variable resistor or variable impedance device. Between the output of rectifier V2 and a point of negative potential wherein negative voltage may be derived from the rectified intermediate frequencies (IF) signal at the receiver second limiter grid (not shown) may be disposed a first resistor R2 to provide D.-C. coupling to D.-C. noise amplifier V3 and a second resistor R3 to provide for correct bias for operation of the noise D.-C. amplifier V3. Resistor R2 therefore may be a D.-C. coupling resistor between the output of rectifier V2 and the control electrode of D.-C. noise amplifier V3. As stated, resistor R3 may be coupled to the negative voltage derived from the rectified IF signal at the grid of the second limiter. From the point designated discriminator which may be an FM receiver discriminator output, the audio plus the low frequency tone signal may be coupled to the selective amplifier V5 which amplifier V5 may be tuned to a single low frequency audio tone. The output of the selective amplifier V5 will be about 180° out of phase with respect to its input. The output of the selective amplifier V5 may be fed to a rectifier stage V7 and the output of rectifier stage V7 may be applied to the control electrode of D.-C. tone amplifier V4. D.-C. noise amplifier V3 may be a triode tube having an anode (or plate), a control electrode, and a cathode. The cathode of D.-C. noise amplifier V3 may be grounded. D.-C. tone amplifier V4 may also be a triode having an anode, a control electrode, and a cathode. The cathode of stage V4 may be connected to one terminal 10 of the two-position control switch S1 which control switch may be the hang-up switch schematically illustrated in FIG. 1 and may have switch contacts 10 and 11 and a contact arm 14 which contact arm may be grounded through the schematically represented pivot 12. As shown in the embodiment of FIG. 2, a three position or triple throw switch S1′ which may be the lever key switch comprising contacts 10′, 11′, 13 and a contact arm 14′ which contact arm may be grounded through a schematically represented pivot 12′. From contact 13 a lead to the transmitter (not shown) may be provided to enable actuation of the transmitter when the contact arm is at position 13 which, for example, may enable applying of ground to the oscillator in the transmitter for keying in a manner to be described.

When receiving, tone plus voice signals from the discriminator may be applied through a filter circuit comprising resistors R4 and R5 and capacitor C1 and C2. An output audio amplifier V6 may be provided which may be a triode tube comprising an anode, a control electrode and a cathode. The output of selective amplifier V5 may be applied through a capacitor C3 and a variable resistor R6 in series to the control electrode of output audio amplifier V6. The circuit consisting of capacitor C3 and variable resistor R6 may be provided in order to enable resistor R6 to be adjusted in connection with the proper capacitance of capacitor C3 to feed to the control electrode of stage V6, a signal in opposition to the tone signal from the discriminator and of phase and magnitude to cancel out the audio tone at the audio amplifier V6, thus preventing tone output when the audio output is enabled to be heard. Resistor R4 may be connected at one end to the discriminator output and resistor R5 may be disposed in series with resistor R4, with the end of resistor R5 opposite the end connected to resistor R4 being electrically connected through coupling capacitor C6 to the control electrode of stage V6. A capacitor C1 may be disposed between the junction of resistors R4 and R5 and ground. A second capacitor C2 may be disposed between the junction of resistor R5 and the coupling capacitor C6 leading to the control electrode of stage V6 and ground. Disposed between a D.-C. source of anode voltage B+ and the anode of stage V6 may be a resistor R7 to develop the anode load of stage V6. Output of audio stage V6 may be coupled through capacitor C4 which capacitor has one end tied to the anode of stage V6. A resistor R11 may be provided between the B+ source and the cathode of stage V6 and when taken in conjunction with resistors R8 and R9 described immediately below these three resistors form a voltage divider network to provide the desired operating point for stage V6 and also through resistors R11, R8 and R10 proper anode operating voltage is applied to the anodes of the D.-C. amplifiers V3 and V4. The cathode of audio stage V6 may be connected to ground through a pair of resistors R8 and R9 in series. Resistor R8 may have one end electrically connected to the cathode of audio stage V6. Bypass capacitor C5 may be disposed between the cathode of stage V6 and ground. Connected between the junction of resistors R8 and R9 and the control electrode of audio stage V6 may be a biasing resistor R10. The anodes of D.-C. amplifiers V3 and V4 may be connected together and directly connected to the control electrode of audio stage V6.

Operation of the above described circuit may be effected as follows: When no signal is present at the receiver antenna terminals, the noise output at the discriminator is high. The high frequency components of this noise are amplified by the noise amplifier V1 and rectified by the noise rectifier V2. The resulting voltage directly coupled to the grid or control electrode of the noise D.-C. amplifier V3 is positive and causes the noise D.-C. amplifier V3 to conduct heavily. The plate current of the noise D.-C. amplifier V3 will flow through resistor R10 causing sufficient voltage drop across resistor R10 to make the grid or control electrode of the audio amplifier V6 negative with respect to the cathode of amplifier V6. Under this condition, audio amplifier V6 is biased into a non-conducting state. When an RF (radio frequency) signal of the frequency to which the receiver is resonant appears at the receiver antenna terminals (not shown), the noise at the discriminator is quieted resulting in substantial reduction in rectified noise output of stage V2 and hence substantially no positive voltage being coupled to the grid of stage V3. The voltage at the grid of the noise D.-C. amplifier V3 then goes sufficiently negative because of the negative voltage derived from the rectified IF signal at the grid of the receiver second limiter (not shown) as to stop plate current flow from the D.-C. noise amplifier V3 through resistor R10. With no anode current flow through resistor R10, there is no voltage drop across that resistor resulting from current flow from stage V3 and the grid to cathode voltage of the audio amplifier V6 then becomes of value to enable operation of stage V6 as a normal class A amplifier in order to allow audio to be conducted through audio amplifier V6.

Tone D.-C. amplifier V4 enables the receiver to amplify audio signals only when the discriminator noise quiets (because of receipt of predetermined RF signals) and the proper signal (representing the users predetermined tone frequency) is received from the tone-selective device. When there is no tone at the frequency to which the tone selective device is responsive, the voltage at the control electrode of tone D.-C. amplifier V4 is positive. The signal from the discriminator is coupled through selective amplifier V5, selective amplifier V5 being tuned to a single low frequency audio tone. The output of selective amplifier V5 is about 180° out of phase from the input to selective amplifier V5 and this is applied through rectifier V7 to the control electrode of tone D.-C. amplifier V4. When there is no tone of a frequency to which this tone selective device is responsive, the voltage at the tone D.-C. amplifier V4 control electrode is positive. With control switch S1 (or S1′ in the modification of FIG. 2) in position to ground the stage V4 cathode, this positive voltage on the control electrode of tone D.-C. amplifier V4 will result in heavy conduction therethrough and this heavy conduction will be applied through stage V4 anode load resistor R10 to develop stage V6 grid to cathode bias thereacross and prevent conduction through audio amplifier V6. Thus no audio output will result when control switch S1 is in tone position 10 (or 10′) the tone position which in either the device of FIG. 1 or FIG. 2 grounds the cathode of the D.-C. tone amplifier V4. When a tone to which the tone-selective device is responsive is received, the tone D.-C. amplifier V4 control electrode voltage goes negative which results in preventing current flow through stage V4 so that audio output is now permitted because of permitted conduction and signal translation through the audio amplifier V6. It is therefore necessary that both the noise and tone D.-C. amplifier V3 and V4, respectively, grids or control electrodes go negative (when they are both in the circuit) in order that the audio amplifier stage V6 can conduct. The operator at the receiver can then hear only those RF carriers whose frequency is the same as the resonant frequency of the receiver and which are modulated with the tone to which the tone selective device is responsive. In this manner a particular tone for a particular receiver may be utilized to enable hearing of voice at the receiver only when the particular tone frequency corresponding to the receiving station is received.

In order to allow the receiver operator to hear any calls on the radio frequency to which the receiver is resonant, it is necessary to disable the tone squelch function. This may be done by means of the switch S1 (or S1′ in the device of FIG. 2) in the cathode of the tone D.-C. amplifier V4. When the switch S1 (or S1′) is in the number 10 (or 10′) or tone position, both the radio frequency carrier and the predetermined or specified tone are required for audio output, but when the switch is in the number 11 (or 11′) or listen position only the radio frequency carrier is required for audio output. The switch in installations such as a mobile installation may be part of the microphone hang-up bracket. This is the hang-up switch modification of the device of FIG. 1. When the microphone is in the hanger, the switch will be in the 10 (or 10′) or tone position wherein the cathode of amplifier V4 is grounded through position 10 (or 10′) so that the operator can hear only those radio frequency signals that are tone coded for him. When the operator lifts his microphone to transmit, the switch S1 is automatically switched to the listen position represented by switch contact 11 (or 11′) wherein the cathode of noise amplifier V4 is disconnected from ground, thus giving the operator automatic monitoring facilities in order that he will not disrupt other communications on the channel. That is, he will hear sound if any other station or operator is transmitting (on the RF channel frequency of the user group) and will be warned not to transmit himself.

In base station installations, for example, the modification of FIG. 2 may utilize a lever key device and schematically is shown with the addition of contact 13′ and its connection to the transmitter key. Keying the transmitter (not shown) may, for example, be effected by grounding an oscillator or signal generator in the transmitter. The switch S1′ may be incorporated as part of a three-position lever switch on the microphone. In the upper position, the switch S1′ may be in the tone position and in the center position it may be in the listen position. These positions are position 10′ and 11′ respectively. In the lower position or position 13′, the switch will be connected to contact 13′ and the transmitter will be actuated and hence activatable. The device of FIG. 2 therefore makes it necessary for the operator to switch through the listen position in order to transmit, thereby giving automatic and enforced channel monitoring, since listening must take place before transmit position is reached.

By means of the circuit of capacitor C3 and adjustable resistor R6 a signal may be impressed on the control electrode or grid of audio stage V6 such that this signal opposes the low frequency tone portion of the signal impressed through the resistors R4 and R5 on the control grid of audio amplifier V6. This thereby leaves only the audio signal (the audio signal plus tone, minus tone) impressed on the control electrode of audio stage V6 which in turn permits only audio (and not tone) to be heard at the output of the receiver while simultaneously providing for the tone signal which tone signal enables disabling of audio output when the predetermined user tone is not being transmitted when the receiver is in listening position, thereby enabling audio to be heard only when a call intended for the receiving station is received. Resistor R6 is adjusted so that in conjunction with C3, a properly phased output of proper amplitude is provided from the output of selective amplifier V5 to the audio amplifier V6, control electrode input so as to cancel the audio tone out. For example, if a 100 cycle (∼) audio tone is used, C3 may be 3300 $\mu\mu$f. (micromicrofarads) and resistor R6 will be adjustable from zero ohms to a top value in the order of three (3) to five (5) megohms (MΩ).

As shown hereinabove a continuous tone-control squelch system has been demonstrated which provides double-barreled squelch action combined with and incorporating automatic monitoring wherein a receiver may remain squelched by the use of both conventional noise squelch and also by tone squelch and wherein in order for audio to be heard at the receiver output, a carrier of the correct radio frequency modulated by a tone of the correct audio frequency must appear at the receiver antenna terminals. The invention demonstrated has additional features such that where several users share the same radio frequency channel, the user equipped with the double-barreled squelch system disclosed herein can be deaf to all other calls except for his own. There is also provided automatic and required means of disabling this feature prior to making a call such that monitoring must be done so as to eliminate interference with other conversations in progress. Thus, there is provided a means for the user to not only selectively hear the user's own systems calls but to also temporarily and automatically provide for hearing all calls which may indicate that others are transmitting prior to transmitting himself. Thus, a user will not carelessly or unknowingly disrupt communications in progress on the channel and the user will not be inconvenienced because the double-barreled approach plus the automatic monitoring features in conjunction with the tone means ensures the fact that only those calls which the receiver is interested in will be heard but nevertheless it will not be necessary for a tone to be heard and there is provided elimination of undue and discomforting noise output and the monitoring provided discourages illegal and discourteous operation.

Therefore the system hereinbefore disclosed allows an operator to hear a message when a channel is in use while keeping the receiver audio circuit in a non-conducting state when the channel is not in use. The disclosed system thereby offers a further method of monitoring that produces modulation output only when a radio frequency carrier of the frequency to which the receiver is resonant is present at the receiver antenna input terminals and provides automatic monitoring at no personal inconvenience or discomfort.

While in nowise to be construed as limiting the scope of the present invention, the following table of values for components of the circuits of the illustrative embodiments exemplify one set of values which demonstrate a successful device of the invention:

| Part: | Value |
|---|---|
| R2 | 1 megohm. |
| R3 | 1 megohm. |
| R4 | 330K ohms. |
| R5 | 330K ohms. |
| R6 | 3 to 5 megohms (at 100~ note). |
| R7 | 100K ohms. |
| R8 | 6800 ohms. |
| R9 | 18K ohms. |
| R10 | 1 megohm. |
| R11 | 47K ohms. |
| C1 | 2200 μμf. |
| C2 | 2200 μμf. |
| C3 | 3300 μμf. |
| C4 | 0.1 μf. |
| C5 | 10 μf. |
| C6 | 1000 μμf. |

| Stage: | Designation |
|---|---|
| V3 | ½ 12AX7. |
| V4 | ½ 12AX7. |
| V6 | ½ 12AX7. |

While the principles of the invention have now been made clear there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. In a communication system having a transmitter, receiver adapted to receive and detect a modulated carrier wave of a predetermined frequency wherein said carrier wave of said predetermined frequency is received by a plurality of users and including means for detecting and reproducing the wave with which said carrier wave is modulated, means for the operator of said receiver to key said transmitter, said reproducing means coupled to said detecting means comprising an audio stage including an electron discharge device having an anode, cathode and control electrode, means for controlling the operation of said reproducing means to maintain it in an inoperative condition in response to the presence of noise and the absence of an identifying signal of a predetermined frequency associated with individual receivers and for automatically indicating to an operator the presence or absence of carrier waves from other transmitters prior to keying of said transmitter, said last named means including control means coupled to said reproducing means, means for producing first direct current voltage in response to the presence of noise at said detecting means, and for producing a second direct current voltage in response to the presence of said carrier wave at said detecting means, means for producing a third direct current control voltage of one polarity in response to the presence of said identifying signal and one of the opposite polarity in the absence of said signal, said means for producing said first and second voltages comprising a cascaded arrangement of an amplifier and a rectifier coupled to said detecting means, the circuit being such that the presence of noise at said detecting means produces direct current voltage of one polarity and the presence of a carrier wave produces a direct current voltage of the opposite polarity, and said means for producing said third voltage comprising means coupled to said detecting means for reproducing a signal of said chosen frequency in series with a rectifier for producing a direct current voltage of said opposite polarity means for applying said first and second voltages to said control means whereby the presence of noise causes the said first voltage to predominate and to disable said reproducing means, means for applying said third direct current voltage to said control means, means for cancelling said identifying signal from the output of said reproducing means including means for applying said signal from the output of said signal reproducing means to the input of said reproducing means in phase opposition, and means for automatically disabling the control means prior to keying of said transmitter to render said reproducing means operative whereby the operator is enabled to detect the presence or absence of other carrier waves having said predetermined frequency.

2. In the communication system as defined in claim 1, wherein said control means comprising a first translating device having its input coupled to the output of said means for producing said first and second direct current voltages and having its output coupled to the input of said reproducing means, and a second translating device having its input coupled to the output of said means for producing said voltage.

3. In a radio receiving apparatus including means for detecting a received signal comprising a modulated carrier wave, an audio stage for applying the detected audio modulation to a reproducing means, a squelch system for said receiver for disabling said audio stage in the absence of either said carrier wave or an identifying signal of a predetermined frequency associated with said receiver, said squelch means including means coupled to said audio stage for applying a biasing voltage thereto, first means responsive to noise at said detecting means for producing a unidirectional noise voltage of one polarity, second means responsive to the presence of a carrier signal at said detecting means for producing a unidirectional control voltage of opposite polarity, third means responsive to the presence or absence of said identifying signal for producing a unidirectional voltage of either said one or said other polarity, said third means producing a unidirectional voltage of said one polarity in the absence of said identifying signal and of said opposite polarity in response to the identifying signal, means to control said audio stage in response to the unidirectional voltages from said first, second, and third means to apply a disabling bias voltage to said audio stage if any of the unidirectional voltages is of the opposite polarity whereby said audio stage is enabled to permit transmission of a signal to the reproducing means only upon the simultaneous presence of a received carrier wave and the identifying signal associated with said receiver, and means for disabling said third means to permit monitoring of signals which do not include the identifying signal.

4. In a radio receiving apparatus including means for detecting a received modulated carrier wave, an audio stage in said receiver for applying the detected audio modulation signals to a reproducing means, a squelch system for said receiver to disable said audio stage in the absence of a received carrier wave and in the absence of an identifying signal of a predetermined frequency associated with said receiver, said squelch means comprising control means coupled to said audio stage for applying a biasing voltage thereto, said control means being placed in a conductive or nonconductive condition upon application of unidirectional voltages of different polarities whereby said control means applies a disabling biasing voltage to said audio stage during one of said conditions and an enabling biasing voltage during the other of said conditions, first means responsive to noise at said detecting means for producing a unidirectional noise voltage of one polarity, means coupling said first voltage producing means to said control means so that the presence of noise voltages of said one polarity biases said control means in the condition to apply a disabling bias voltage to said audio stage, second means responsive to the presence of a carrier signal at said detecting means for producing a unidirectional control voltage of opposite polarity, means coupling said second voltage producing means to said control means so that the control voltage of opposite polarity is applied thereto, third means responsive to the presence or absence of said identifying signal for producing a unidirectional voltage of either said one or said other polarity, said last named means producing a voltage of said one polarity in the absence of an identifying signal and of said opposite polarity in the presence of said identifying signal, said third means being coupled to said control means, said control means being responsive to unidirectional voltages from said first, second and third means so that said control means is placed in one of said conditions to apply a disabling bias to said audio stage with the application voltages of said one polarity and in the other of said conditions to apply an enabling bias voltage to said audio stage upon application of a voltage of the opposite polarity whereby said audio stage is operative to transmit a signal to the reproducing means only upon the simultaneous presence of an identifying signal and a modulated carrier at said detecting means.

References Cited in the file of this patent

UNITED STATES PATENTS

| | | |
|---|---|---|
| 2,410,149 | Clark | Oct. 29, 1946 |
| 2,678,384 | Beers | May 11, 1954 |
| 2,706,242 | Rawson | Apr. 12, 1955 |
| 2,743,361 | Bauman | Apr. 24, 1956 |
| 2,770,721 | Clark | Nov. 13, 1956 |
| 2,913,711 | Polyzou et al. | Nov. 17, 1959 |